April 26, 1966 J. S. BRYAN 3,248,552

PHOTOSENSITIVE OPTICAL LOGIC UNIT FOR USE IN A COMPUTER SYSTEM

Filed Sept. 25, 1962 5 Sheets-Sheet 1

INVENTOR.
JAMES S. BRYAN

BY

Robert D. Sanborn
ATTORNEY

April 26, 1966 J. S. BRYAN 3,248,552

PHOTOSENSITIVE OPTICAL LOGIC UNIT FOR USE IN A COMPUTER SYSTEM

Filed Sept. 25, 1962 5 Sheets-Sheet 2

INVENTOR.
JAMES S. BRYAN
BY
Robert D. Sanborn
ATTORNEY

April 26, 1966 J. S. BRYAN 3,248,552

PHOTOSENSITIVE OPTICAL LOGIC UNIT FOR USE IN A COMPUTER SYSTEM

Filed Sept. 25, 1962 5 Sheets-Sheet 3

INVENTOR.
JAMES S. BRYAN
BY
Robert D. Sanborn
ATTORNEY

April 26, 1966 J. S. BRYAN 3,248,552
PHOTOSENSITIVE OPTICAL LOGIC UNIT FOR USE IN A COMPUTER SYSTEM
Filed Sept. 25, 1962 5 Sheets-Sheet 4

INVENTOR.
JAMES S. BRYAN
BY
Robert D. Santow
ATTORNEY

INVENTOR.
JAMES S. BRYAN
BY
Robert D. Sanborn
ATTORNEY

United States Patent Office 3,248,552

Patented Apr. 26, 1966

3,248,552

PHOTOSENSITIVE OPTICAL LOGIC UNIT FOR USE IN A COMPUTER SYSTEM

James S. Bryan, Hatboro, Pa., assignor to Philco Corporation, Philadelphia, Pa., a corporation of Delaware Filed Sept. 25, 1962, Ser. No. 226,100
3 Claims. (Cl. 250—219)

The present invention relates to computer systems using majority logic and more particularly to components for optically coupled computers to implement majority logic functions encountered in pattern recognition applications.

In one form of pattern recognition system the pattern is viewed by a plurality of recognition units. Each recognition unit comprises a mask, means responsive to the total light passing through the mask and a threshold unit for producing an electrical output signal only if the total light exceeds a preselected threshold value. Each recognition unit has a different mask and/or threshold level. The outputs of various threshold units are combined in suitable logic networks. When used in pattern recognition applications each logic network provides a signal representative of the probability that the pattern viewed is the particular pattern (or a pattern type) represented by that network. The outputs of the logic networks may be combined in a second level of logic networks to increase the probability of correct identification of the pattern.

In the prior art, the logic networks have generally taken the form of resistance weighting networks. Each logic network may receive inputs from a large number of recognition units. Further, each recognition unit may supply a signal to a plurality of logic networks. As a result, the resistor networks involved become extremely complex. The complexity makes the networks difficult to compute, difficult to construct and difficult to change. Changes may be required to accommodate changes in the character to be recognized or changes in the mask employed for recognition purposes.

It is an object of the present invention to provide improved elements for pattern recognition systems and other majority logic applications which are inexpensive, relatively easy to construct and readily changed.

It is a further object of the invention to provide improved logic elements which have optical inputs and optical outputs.

Still another object is to provide elements for computers employing majority logic which can generate their own weighting masks.

An additional object is to provide elements for a probability computer and circuits employing majority logic which may be optically cross-coupled to a relatively large number of similar elements of a preceding or succeeding array.

These and other objects of the invention are achieved by providing units which comprise a plurality of lens elements arranged in a preselected array. A filter or mask is positioned in the image plane of the lens array. The mask is provided with a plurality of discrete masking areas each having regions of different light transmittance. A light output element comprising photoemitters controlled by corresponding photosensitive members is positioned so that each photosensitive member receives light passing through a respective one of said masking areas. Said photoemitters are caused to emit light if the light passing through the corresponding masking area is above a selected threshold value.

For a better understanding of the present invention together with other and further objects thereof reference should now be had to the following detailed description which is to be read in conjunction with the accompanying drawings in which FIG. 1 is an exploded view of two optically coupled units;

Figures 1, 4, 6:
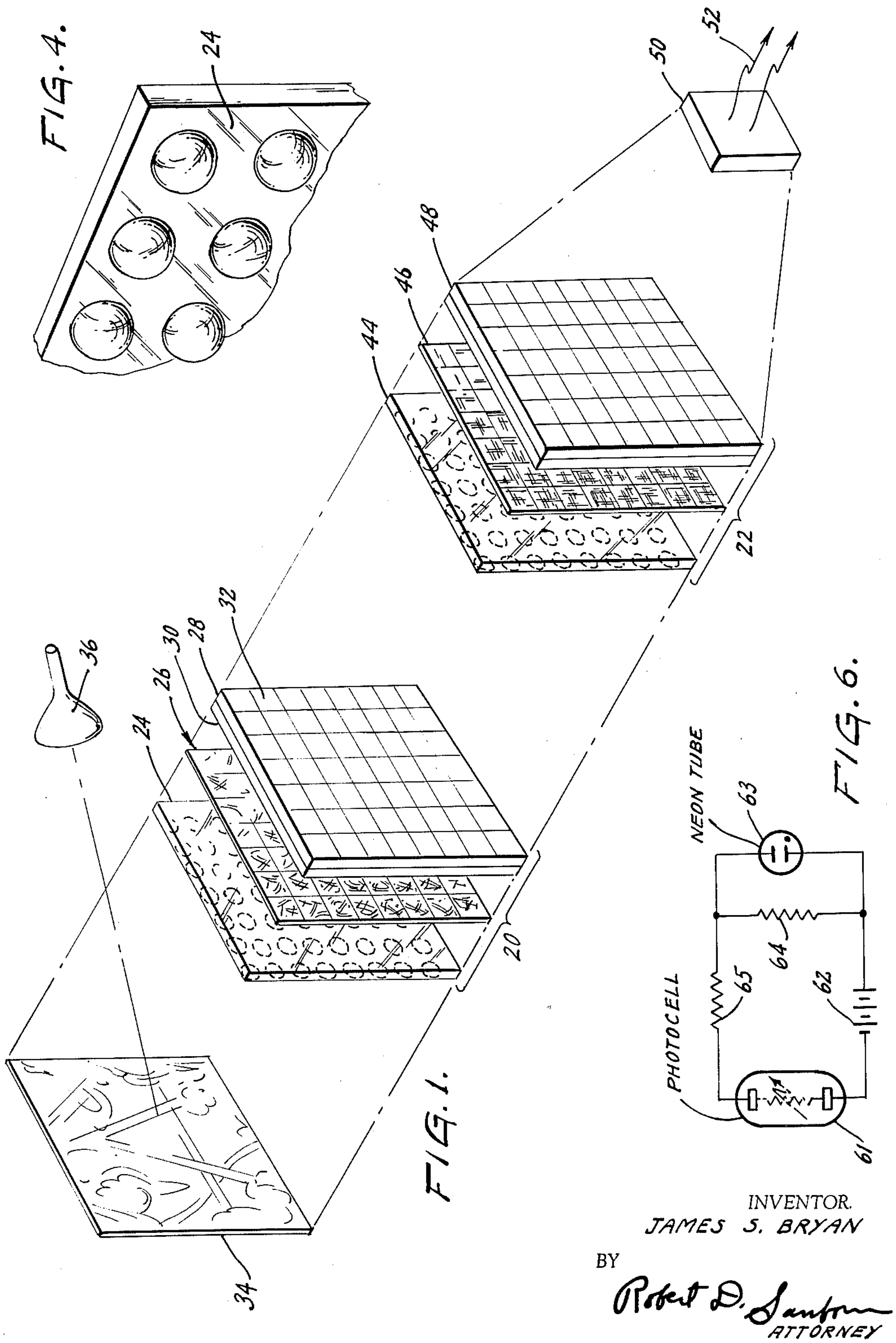
FIG. 4 is a perspective view of one preferred form of lens structure for the unit of FIG. 1.
FIG. 6 is a schematic diagram of a portion of the photoresponsive element of FIG. 1.

FIG. 1 shows an exploded view of two optically coupled units 20 and 22. Unit 20 comprises an array 24 of 56 lens elements arranged in seven columns of eight elements each. The unit 20 further comprises an optical mask 26 which has 56 sections. These 56 sections are in optical alignment with the 56 lens elements of array 24. The third component of unit 20 comprises photoresponsive light source 28 having 56 separately energizable elements or regions. Again the 56 separately energizable elements or regions are arranged in seven columns of eight elements each. Each element of source 28 is in optical alignment with a corresponding element of lens array 24. Each photo-responsive element of component 28 comprises a light sensitive element facing the surface 30 adjacent mask 26 and a light emitting element or region facing the opposite surface 32.

The pattern to be viewed by unit 20 is shown diagrammatically at 34. This pattern may take the form of a photographic print or negative, a drawing, manuscript, an aerial view of the earth, a view of a cloud chamber or the like. In FIG. 1 it is assumed that pattern 34 is a photographic print which is suitably illuminated by light source 36. Each lens element of array 24 focuses all or any selected part of the pattern 34 on the section of mask 26 associated therewith. Each section of mask 26 is formed with areas of different light transmittance selected to provide a maximum response to selected patterns or pattern types and lesser responses to patterns of other types.

Each photo-responsive element of component 28 will provide a light output from its portion of surface 32 if the light passing through the corresponding section of mask 26 and falling on surface 30 exceeds a preselected threshold value. Each region of component 28 may be arranged so that a light output is provided only so long as the light falling on the photo-sensitive member of that region exceeds a preselected value. Alternatively, the regions may be arranged so that the light output continues even though the illumination falling on the photo-sensitive member of that region is removed or falls below the threshold level. The light output may be extinguished by disconnecting the energy source for unit 28 or any selected regions thereof. In either event component 28 will display a checkered pattern of light on surface 32. Each lighted area will represent the presence of a selected characteristic in the scene 34.

In FIG. 1 it is assumed that the individual regions of component 28 have a rectangular shape. However, the lighted areas produced by each region may have any fixed shape, regular or irregular. Similarly, the individual units of the three components 24, 26, and 28 of unit 20 may be arranged in any array, either regular or irregular.

Unit 22 comprises a lens array 34, a mask 46 and array 48 of photo responsive regions similar to the regions of element 28. Components 44, 46 and 48 may be similar to components 24, 26 and 28 of unit 20. However, the patterns present in the individual sections of mask 46 will take forms different from those on mask 26 since unit 22 views the checkered pattern of surface 32 rather than the pattern 34.

Unit 22 is shown as comprising elements arranged in seven columns of 8 elements each like the element 20. This is advantageous in that each unit may be employed at any level of the computer system simply by changing the masks 26 and 46. However, it is to be understood that unit 22 may have more or less elements than unit 20 and that they may be arranged in a different array.

The lenses of array 44 or the individual sections of mask 46 may be arranged so that each photo sensitive light source of component 48 responds to the light output of less than all of the sources of component 28. As will be explained in more detail presently the photo sensitive light source of component 48 may be made to respond differently to different light sources of component 28 by varying the density of filter 46 in areas corresponding to the respective light source of component 28.

Block 50 of FIG. 1 represents means for obtaining an electrical output from the system shown. Block 50 may be a photocell which produces an electrical signal on leads 52. This signal may have an amplitude proportional to the number of light emitting regions of component 48. While only two units 20 and 22 are shown in FIG. 1 it is to be understood that any number can be utilized in cascade.

Figure 2:
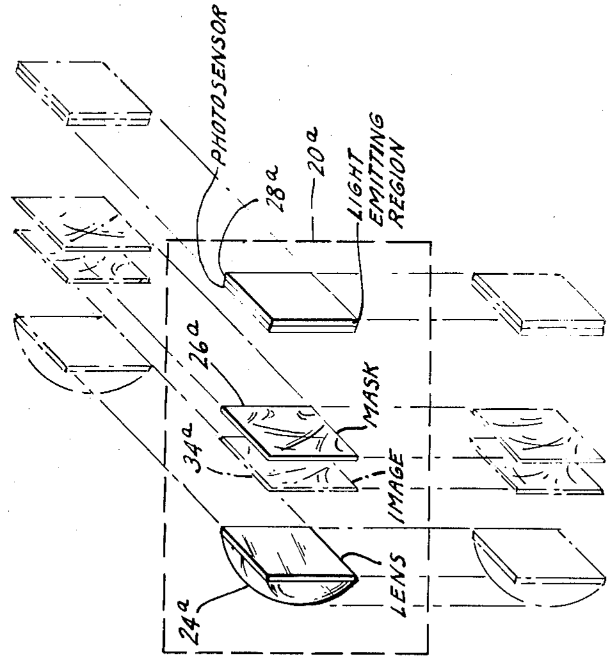
FIG. 2 is a more detail view of a portion of one of the units of FIG. 1.

FIG. 2 is an exploded view of a portion of unit 20 of FIG. 1 showing the relationship of the image 34$^a$ formed by lens 24$^a$ to one section 26$^a$ of mask 26. The mask section 26$^a$ may be formed of random transparent and opaque areas or it may be formed photographically to represent certain characteristics. For example, photographic forming of the mask may be accomplished by placing a photographic negative in the position occupied by mask 26. All areas of the negative except the area corresponding to area 26$^a$ are covered by an opaque mask. A plurality of different patterns, each having the characteristic to be recognized by the element 20$^a$ are placed in succession in the area occupied by pattern 34 in FIG. 1. Suitable shutter means (not shown) may be employed for controlling exposure time of the negative to each pattern and for preventing exposure of the negative during changes of the pattern. After the area corresponding to the section 26$^a$ has been exposed to the selected number of patterns the other 55 sections are exposed in a similar fashion using a different characteristic for each section. When all 56 sections have been exposed the negative is developed to form the mask 26.

Figure 3:
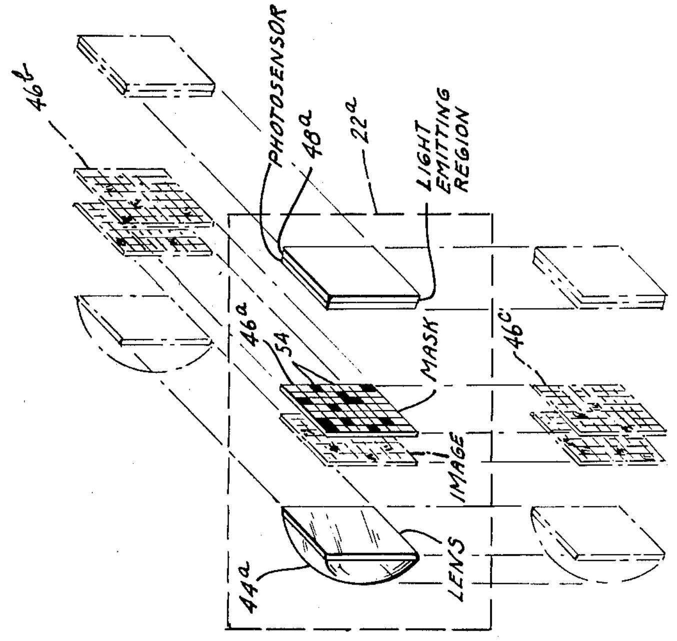
FIG. 3 is a more detailed view of the second unit of FIG. 1.

FIG. 3 is a more detailed view of a portion of unit 22. Each of the small blocks 54 on section 46$^a$ of mask 46 corresponding to the image of one of the light emitting elements or regions of component 28 as formed by lens element 44$^a$. If a block 54 is opaque the presence or absence of a light output from the corresponding region of component 28 will have no effect on the operation of source 48$^a$. If the area 54 will transmit some light the corresponding region on component 28 will have an effect on the operation of source 48$^a$ which is proportional to the transmittance of the corresponding section 54. Thus the influence of any particular characteristic of the scene 34 on the output source 48$^a$, for example, may be "weighted" by controlling the transmittance of the appropriate region in section 46$^a$ of mask 46. Other sections 46$^b$ and 46$^c$ of mask 46 may be similar to section 46$^a$ except that different regions of component 28 are given different weights.

FIG. 4 is an enlarged perspective view of the lens array 24 shown in FIG. 1. Preferably, the optical axes 56 of the lens element 24$^a$, 24$^b$ and 24$^c$ etc. converge slightly so that each section of the mask 26 receives the same view of pattern 34 regardless of the position of the section on mask 26. The lens array shown in FIG. 4 may be molded of glass or plastic. Other forms of lens arrays may be substituted for the one shown.

Figure 5:
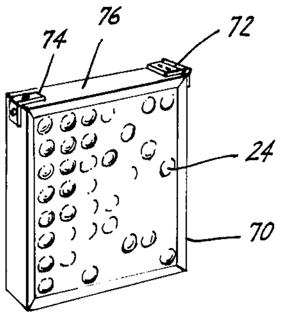
FIG. 5 is a view of one of the units of FIG. 1 as assembled.

FIG. 5 provides a more detailed showing of the mechanical features of a preferred embodiment of unit 20. As shown in FIG. 5 the three components 24, 26 and 28 are held together by a surrounding frame 70. Frame 70 is provided with a hinge member 72 at one corner thereof and a fastening member 74 at an adjacent corner. Members 72 and 74 permit the upper side 76 of frame 70 to be opened to permit insertion of components 24, 26, and 28 and to permit the removal and insertion of different masks 26.

FIG. 6 shows one form that the photo responsive elements of component 28 may take. A photocell 61 is connected in series with an energy source 62 and a neon tube 63. A bleeder resistance 64 is connected across neon tube 63. A current limiting resistor 65 is placed in series with tube 63 for limiting the current through neon tube 63. The entire unit 28 is made up of 56 circuits of the type shown in FIG. 6. The bias source 62 may be common to all 56 circuits but all other elements are duplicated for each of the 56 circuits.

In operation, the photocell 61 is positioned to receive light passing through one of the 56 regions of mask 26. Neon tube 63 is positioned to illuminate a corresponding one of the 56 regions on surface 32. If the light falling on photocell 61 through mask 26 exceeds a preselected threshold value neon tube 63 will conduct and produce an output signal for the corresponding region of surface 32. The photocell 61 may be masked so that it does not receive light from neon tube 63. If this is done neon tube 63 will have a light output which is a function of the intensity of the light falling on photocell 61. Alternatively, photocell 61 and neon tube 63 may be positioned so that a portion of the light output of neon tube 63 illuminates photocell 61. If this is done the light output of neon tube 63 may be made to assume a preselected level once the illumination falling on photocell 61 by way of mask 26 exceeds the threshold level at which conduction through neon tube 63 is indicated.

Figure 7:
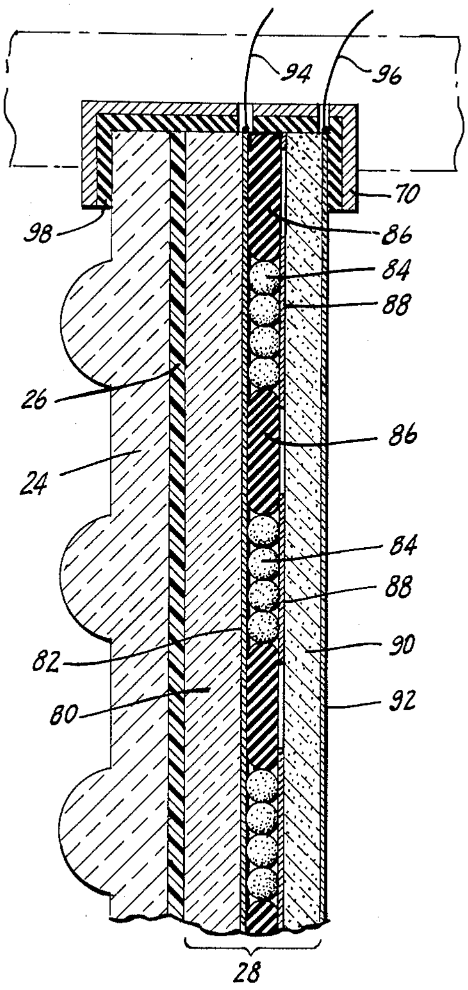
FIG. 7 is a detailed, fragmentary cross section of another possible embodiment of the present invention.

FIG. 7 is a fragmentary cross-section of an alternative form of the invention. Parts in FIG. 7 corresponding to like parts in FIGS. 1 and 5 have been identified by the same reference numerals. It is believed that frame member 70, lens array 24 and mask 26 require no further explanation. Component 28 comprises a glass substrate 80 on which is formed a transparent conductive coating 82. A photoconductive material 84 is deposited in small regions on the transparent conductive layer 82. These regions are arranged in rows and columns as illustrated in FIG. 1. The photoconductor may be a material such as cadmium sulphide. The proper impedance for the photoconductive layer 84 is achieved by depositing the photoconductor as a surface coating on glass beads, the glass beads being arranged to make up the regions 84. An opaque insulating material 86 surrounds each of the photoconductive regions 84 and acts as a light shield between the adjacent regions in the array 28. It will be understood that material 86 has the form of a grid on conductor 82. The photoconductive regions 84 are located within the openings of the grid. Small patches of a transparent conductive material 88 overlie each of the photoconductive regions 84.

Member 90 which overlies the conductive patches 88 comprises an electroluminescent phosphor in a glass dielectric. The surface of member 90 which corresponds to surface 32 of FIG. 1 is covered by a transparent conductor 92. Leads 94 and 96 which connect with conductive layers 82 and 92, respectively, provide means for supplying appropriate biasing potential to the assembly shown. It has been found that a four hundred cycle signal at a level of several hundred volts will provide satisfactory operation of the component 28. A suitable resilient insulating material 98 may be provided between frame 70 and the remaining structure to provide mechanical cushioning and electrical insulation.

Figure 8:
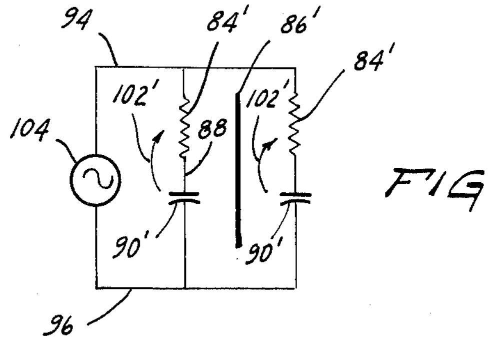
FIG. 8 is an equivalent circuit of the unit shown in FIG. 7.

FIG. 8 is an equivalent circuit of the structure shown in FIG. 7. In FIG. 8 the photoconductive regions 84 are represented by resistors 84'. The active areas of the electroluminous layer 90 are represented by capacitors 90'. The arrows 102 represent the optical coupling between layers 90 and regions 84 which takes place through the transparent electrode 88. The heavy line 86' represents the light shielding between adjacent units afforded by the material 86 of FIG. 7. It is to be understood that while the electroluminous layers 90 is shown as a continuous sheet the material will emit light only in the region between the conductive patches 88 and the conductive surface 92. Therefore, the luminous layer is effectively divided into regions corresponding to the photo sensitive regions 84. Generator 104 of FIG. 8 schematically represents an appropriate source bias potential for the unit.

The operation of the structure shown in FIG. 7 may be explained as follows. If a photoconductive region 84 is not being illuminated from any source it will have a high impedance and no current will flow therethrough. Therefore, the region of the electroluminous layer 90 associated therewith will not emit light. However, if light from an external source is allowed to fall on one of the regions 84 the resistance of that region will be reduced and the current through the corresponding region of electroluminous layer 90 will increase. This will cause the corresponding region of layer 90 to emit light. If the illumination of photoconductor 84 from an external source is above the threshold value for the unit, the light emitted by electroluminous layer 90 will be sufficient to maintain the resistance of photoconductor 84 at its low value. Thus that particular region of electroluminous layer 90 will continue to emit light until the bias potential supplied to leads 94 and 96 is removed. It is to be understood that each of the photoconductors 84 receives light from a different lens on array 24 and through a different section of mask 26. Therefore areas of electroluminous material 90 adjacent certain ones of the photoconductors 84 may emit light while areas adjacent other ones of photoconductors 84 will not emit light.

Figure 9:
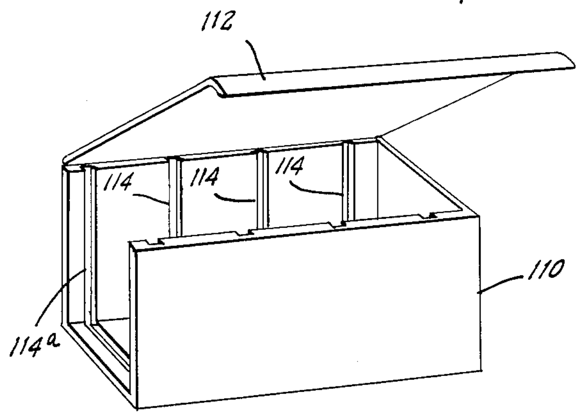
FIG. 9 shows an enclosure for the units of FIGS. 1 and 7.

It will be understood that in practice it will be necessary to provide means for preventing ambient light from falling on the photoconductor sections 84. Also, it will be necessary to maintain elements 20 and 22 at a proper spacing so that the individual lens on array 44 will produce images of surface 32 in the plane of mask 46. The means whereby this spacing is maintained and the ambient light excluded does not form a part of the present invention. However, by way of illustration, one simple means for accomplishing this is shown in FIG. 9. The structure of FIG. 9 comprises a light-tight box 110 having one end thereof open. Box 110 is provided with a hinged, light-tight cover 112. The interior of the box 110 is provided with grooves 114 which will receive the edges of frame 70. Units corresponding to units 20 and 22 of FIG. 1 may be placed in the appropriate slots 114 and the cover 112 closed. If the pattern to be viewed is in the form of a transparency, this transparency may be mounted in a frame similar to frame 70 and placed in the slot $114^a$ nearest the open end of box 110.

Figure 11:
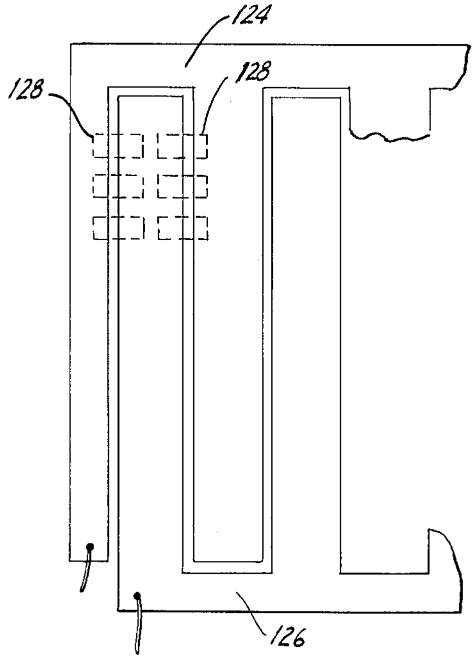
FIG. 11 is a fragmentary front view of the unit of FIG. 10.
Figure 10:
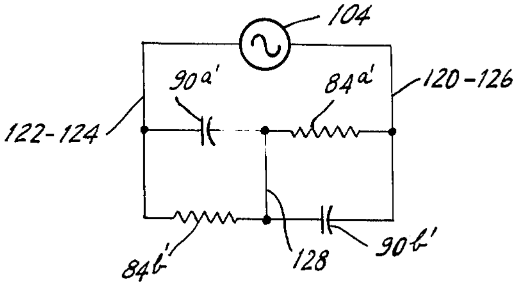
FIG. 10 is a detailed, fragmentary cross section of a modified form of the unit of FIG. 7.

FIGS. 10 and 11 illustrate an embodiment of the invention in which component 28 includes two photo responsive light sources for each lens in array 24. These photo responsive light sources are arranged in bi-stable pairs. Therefore if the light passing through one lens element and the section of mask 26 associated therewith exceeds the selected threshold value, one photo responsive source will emit light. If the incident light is less than the threshold value, the other source of the bi-stable pair will emit light. This provides a positive indication that the input light is less than selected threshold value. Parts in the embodiment of FIG. 10 corresponding to like parts in FIG. 7 have been identified by the same reference numerals.

The conductive layer between the glass substrate 80 and the photoconductive members $84^a$ and $84^b$ comprise two interleaving electrodes 120 and 122 which have the same shape as electrodes 124 and 126 on the surface of electroluminous layer 90. Electrodes 124 and 126 are shown in more detail in FIG. 11. The electrode 120 is electrically connected to electrode 126 and electrode 122 is electrically connected to electrode 124. The transparent conductive member 128 in FIG. 10 is similar to conductive member 88 of FIG. 7 except that it connects the two photoconductive members $84^a$ and $84^b$. The broken rectangles 128 in FIG. 11 indicate the position of conductive coatings 128 relative to the electrodes 124 and 126. Lens array 24 is modified so that a lens element is provided only for photoconductor $84^b$ and not for photoconductor $84^a$ of the pair.

Figure 12:
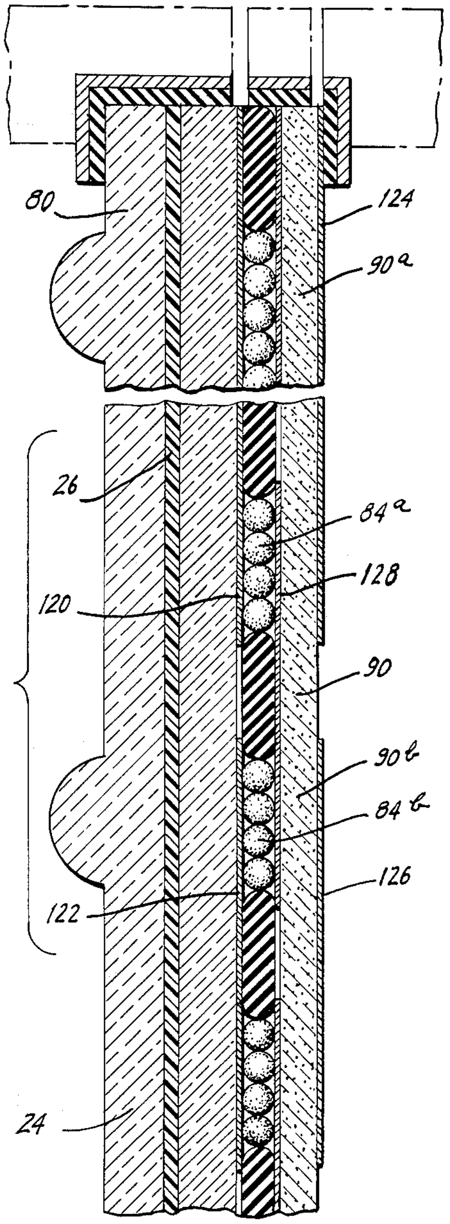
FIG. 12 is an equivalent circuit of the unit shown in FIGS. 10 and 11.

FIG. 12 is an equivalent circuit of the embodiment shown in FIGS. 10 and 11. Generator 104 corresponds to the similarly numbered element in FIG. 8. The bi-stable pair formed by photoconductors $84^a$ and $84^b$ and the sections $90^a$ and $90^b$ of the electroluminous layer 90 are biased so that, in the absence of light falling on member $84^b$ by way of the associated lens element, light is emitted from region $90^a$. The light emitted from section $90^a$ will cause photoconductor $84^a$ to have a relatively low impedance. This will reduce the potential drop across region $90^b$ of the electroluminous layer 90 and prevent light emission from this area. However, if the light passing through mask 26 and falling on photoconductor $84^b$ exceeds a preselected level, region $90^b$ of electroluminous layer 90 will emit light which will further reduce the impedance of photoconductor $84^b$. This will cause a decrease in the illumination provided by region $90^a$. A regenerative action will ensue which will extinguish the light output from region $90^a$ and establish light output from region $90^b$.

The units which follow the one shown in FIGS. 10–11 employ the light output of regions $90^a$ and $90^b$ as complementary input signals. It is to be understood that an embodiment employing bi-stable pairs of output elements may be constructed using photocells and neon tubes.

Figure 13:
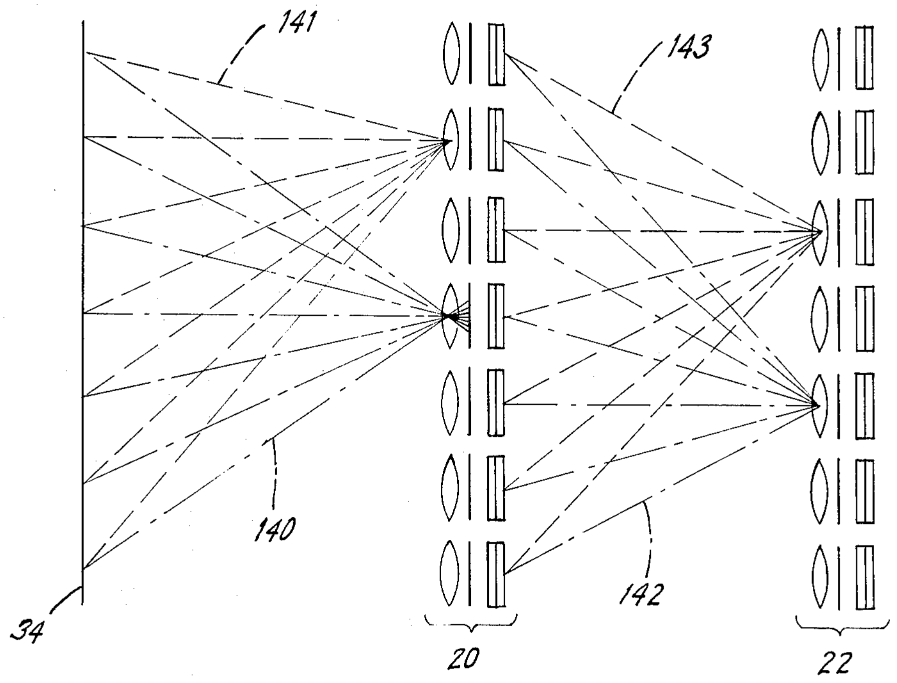
FIG. 13 is a diagrammatic representation of the optical cross coupling possible with the units of FIGS. 1, 7, 10 and 11.

FIG. 13 is a view showing a few of the many possible optical cross coupling paths 140, 141, 142 and 143 possible with the structure shown in FIG. 1. Parts in FIG. 13 corresponding to like parts in FIG. 1 have been identified by the same reference numerals. Since each element of unit 22 may respond to all or any selected number of the elements of unit 20 it will be seen that the number of elements in unit 22 may be greater or less than the number of elements in unit 20.

While the invention has been described with reference to what is at present considered to be the preferred embodiments thereof, it will be apparent that various modifications and other embodiments thereof will occur to those skilled in the art within the scope of the inventor. Accordingly, I desire the scope of my invention to be limited only by the appended claims.

What is claimed is:

1. An optically coupled computer system comprising a plurality of sandwich-like optical logic units spaced from each other and arranged in cascade, each spaced optical logic unit comprising a mask disposed in an intermediate location in said sandwich-like unit, said mask being formed with a plurality of discrete masking areas thereon, each masking area including regions having different light transmittance, optical means including a plurality of lens-like structures adjacent one surface of said sandwich-like unit, each lens-like structure imaging at least a portion of a remote scene on a respective one of said masking areas, at least some portions of the remote scene being imaged on more than one masking area, an output member adjacent the second surface of said sandwich-like unit, said output member including means for radiating light from selected regions of the surface thereof, and a plurality of light responsive control members disposed betwen said mask and said output member, each light responsive control member being interposed between a respective one of said masking areas and a respective region of said output member, each control member being adapted to cause light to be emitted from the associated region of said output member in response to light passing through the associated masking area which has an intensity in excess of predetermined threshold value, said remote scene for each of said logic units except the first in said cascade arrangement being said second surface of the preceding unit in said cascade arrangement, the said spacing between adjacent optical logic units being sufficient to permit the lens-like structure of each logic unit except the first to image a plurality of light radiating regions of the output member of the next preceding optical logic unit on each masking area associated with that lens-like structure.

2. A sandwich-like optical logic unit comprising a mask disposed in an intermediate location in said sandwich-like unit, said mask being formed with a plurality of discrete masking areas therein, each masking area including regions having different light transmittance, optical means adjacent one surface of said sandwich-like unit for separately imaging at least a portion of a remote scene on each of said discrete areas, at least some portions of the remote scene being imaged on more than one masking area, an output member adjacent the second surface of said sandwich-like unit, said output member including means for radiating light from selected regions of the surface thereof, said selected regions occurring in pairs, and a plurality of pairs of light responsive control members disposed between said mask and said output member, each pair of control members being associated with a corresponding pair of selected regions, said control members and associated selected regions forming a plurality of bistable light output means, one light responsive control member of each pair being interposed between a respective one of said masking areas and a respective region of said output member, said one light responsive control member of each pair causing light to be emitted from the associated region of said output member in response to light passing through the associated masking area which has an intensity in excess of a predetermined threshold value and to extinguish the light output from the other output region of the same pair.

3. An optically coupled computer system according to claim 1 wherein said output member comprises an electroluminous layer and a plurality of discrete electrotrodes formed on said electroluminous layer, each of said electrodes being positioned opposite a respective one of said masking areas, and wherein each of said light responsive control means comprises a photoconductive member disposed between a respective one of said masking areas and said electroluminous layer and in contact with a respective one of said discrete electrodes and means for impressing a bias potential across said photoconductive member and the electroluminous layer in series.

References Cited by the Examiner

UNITED STATES PATENTS

| | | | |
|---|---|---|---|
| 2,909,668 | 10/1959 | Thurlby et al. | 250—208 X |
| 3,018,689 | 1/1962 | Saxe | 250—65 X |
| 3,058,002 | 10/1962 | Sihvonen | 250—213 X |
| 3,064,519 | 11/1962 | Shelton | 340—146.3 X |
| 3,085,227 | 4/1963 | Brown | 340—146.3 |
| 3,114,045 | 12/1963 | Mash | 250—213 |

OTHER REFERENCES

Brown: Electronics, Nov. 25, 1960, vol. 33, No. 48, pp. 115–117.

Krolak et al.: Journal of the SMPTE, vol. 72, No. 3, March 1963, pp. 177–180.

RALPH G. NILSON, *Primary Examiner.*

WALTER STOLWEIN, *Assistant Examiner.*